UNITED STATES PATENT OFFICE.

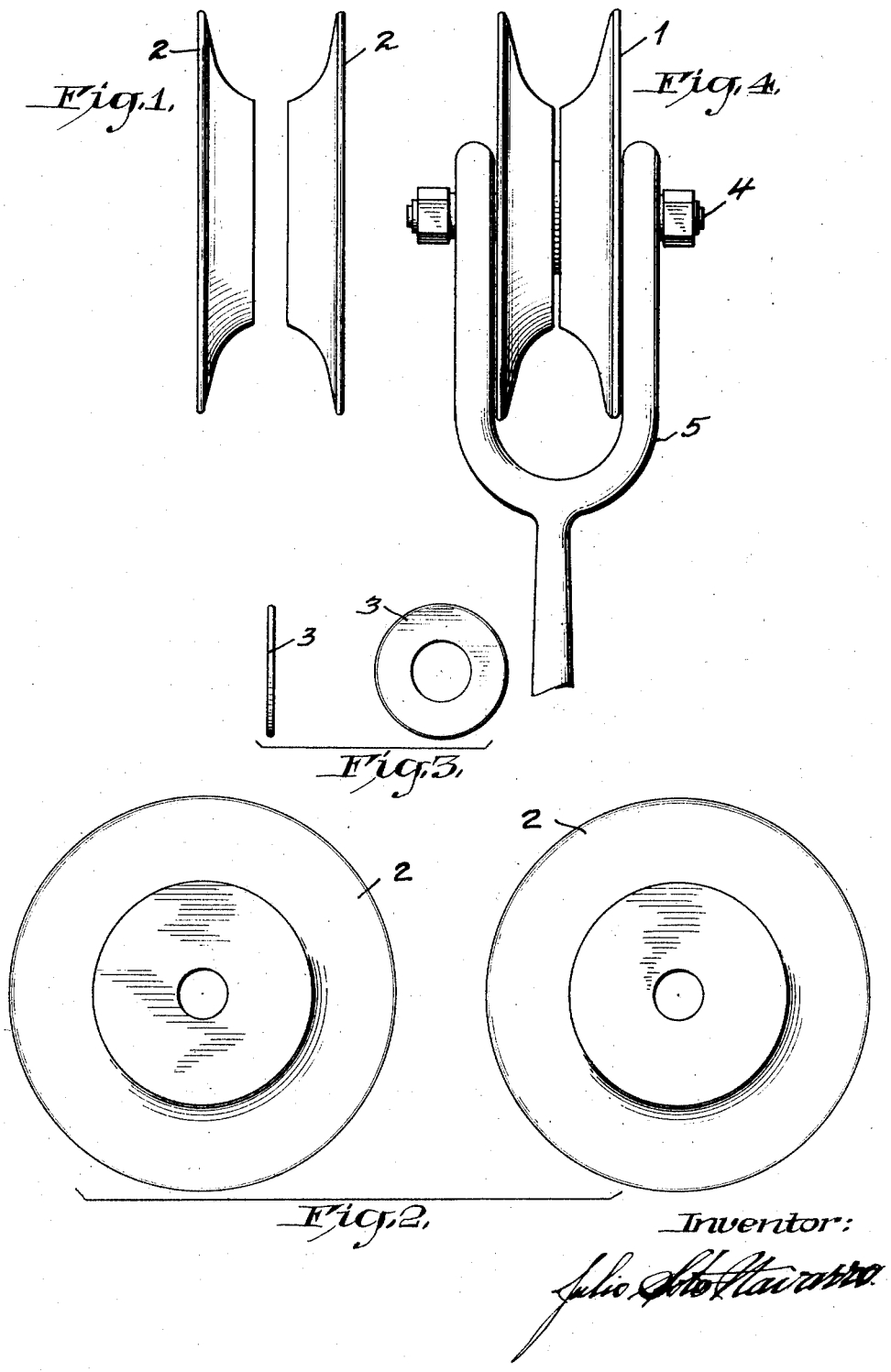

JULIO SOTO NAVARRO, OF HABANA, CUBA.

TROLLEY-WHEEL FOR ELECTRIC STREET-CARS.

1,388,590.

Specification of Letters Patent. Patented Aug. 23, 1921.

Application filed March 21, 1921. Serial No. 454,232.

*To all whom it may concern:*

Be it known that I, JULIO SOTO NAVARRO, a citizen of the Republic of Cuba, residing at 88 Prado St., Habana, Cuba, have invented a new and useful Trolley-Wheel for Electric Street-Cars, of which the following is a specification.

My invention relates to improvement in trolley wheels for electric street cars, in which, a wheel made in separate halves (in disk form) is placed together on the same axle, each having free movement of the other.

The objects of my improvement are: first, to avoid the trolley wheel jumping the wire at the curves, or other obstacles: second, to obtain a better electrical connection: and third, resulting more economic construction.

I attain these objects, by the mechanism illustrated in the accompanying drawing, in which,—

Figure 1, represents vertical view of both halves of the wheel, (divided in disk form) Fig. 2, represents another view of same halves of the wheel: Fig. 3, represents a washer to be used between both halves of the wheel: Fig. 4, represents both halves of the wheel, joined on the same axle (with washer between) and placed on the harp of the trolley pole, ready for use.

By using the wheel 1 composed of separate parts 2, (two parts or halves, in the present instance) an independent movement or revolution of each part on the axle 4 mounted in trolley harp 5, is obtained, affording a protection against the wheel leaving the wire at each curve. Trials have proven, that each part of this wheel turns at different rates of velocity, according to angle of curve, avoiding with this improvement, the strong resistance of the one piece wheel, which by its nature, forces itself off the wire, at almost every curve or obstacle. By placing the washer 3 (shown in Fig. 3) between these separate parts of the wheel, an easier action is obtained.

By using the wheel composed of separate parts, the surface exposed to electric contact is increased, therefore obtaining a more perfect electrical connection.

By using the wheel composed of separate parts, it stands to reason that it is more economical to replace a damaged portion of the wheel, than to replace the entire wheel.

I claim:

1. A trolley wheel for electric cars comprising separate halves in disk form, both halves to be used mounted together on same axle, each half being free to rotate independently of the other, and means for maintaining said halves apart to insure independent rotation.

2. A trolley wheel for electric cars comprising separate halves in disk form, both halves to be used mounted together on the same axle, each half being free to rotate independently of the other, and a washer mounted on the axle interposed between said halves.

In testimony whereof I have signed my name to this specification.

JULIO SOTO NAVARRO.